UNITED STATES PATENT OFFICE.

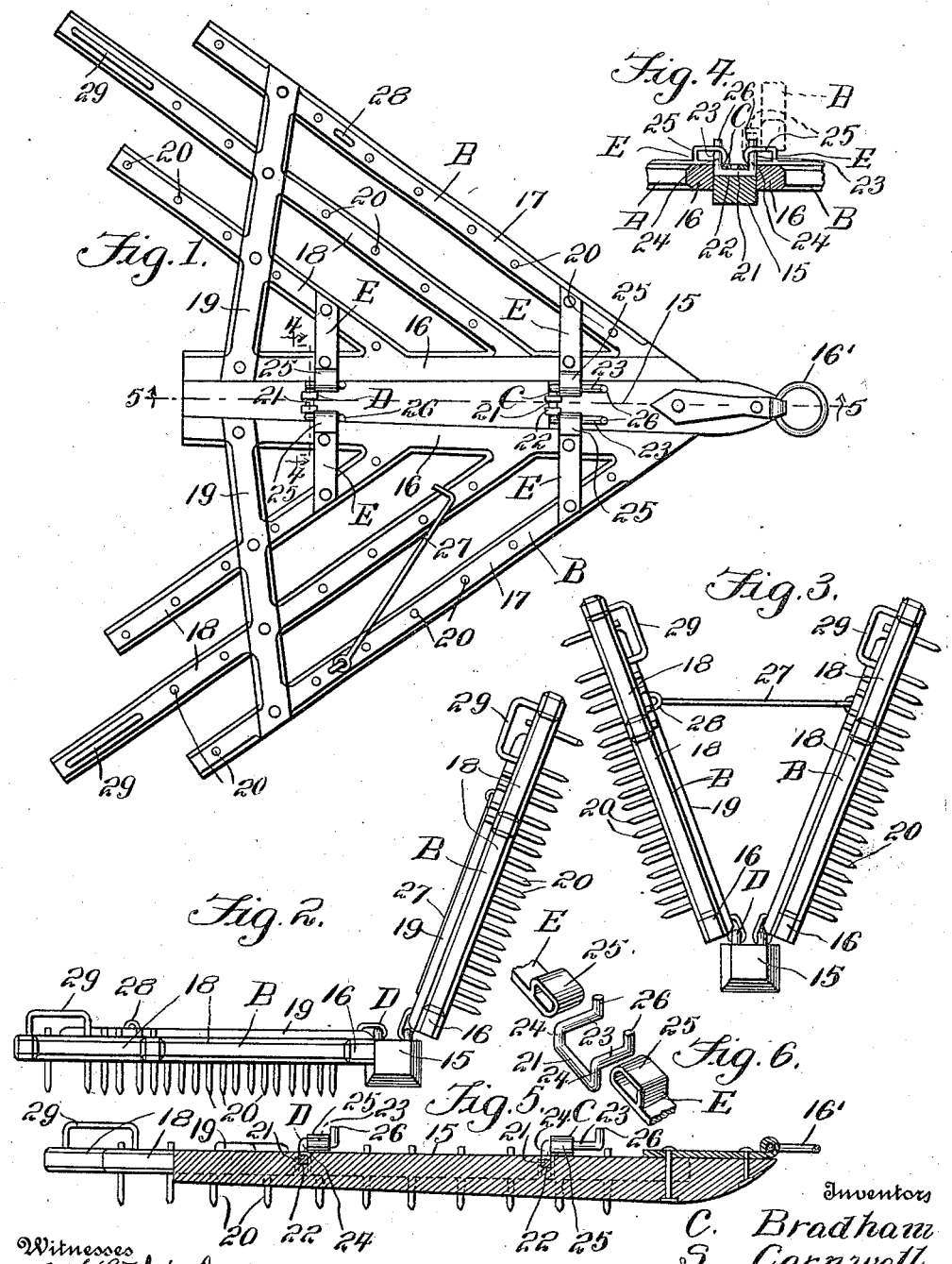

CALVIN BRADHAM AND SAM CORNWELL, OF VANDUSER, MISSOURI.

WING-HARROW.

1,181,287.   Specification of Letters Patent.   Patented May 2, 1916.

Application filed June 25, 1915. Serial No. 36,380.

*To all whom it may concern:*

Be it known that we, CALVIN BRADHAM and SAM CORNWELL, citizens of the United States, residing at Vanduser, in the county of Scott and State of Missouri, have invented new and useful Improvements in Wing-Harrows, of which the following is a specification.

This invention relates to harrows, and it has particular reference to that class which are known as wing harrows in the embodiment of which the wings or harrow sections are flexibly connected with a body member constituting a draft bar.

The present invention has for its object to simplify and improve the construction of a device of this class to enable the wings to be securely connected with the draft element and to enable said wings to be raised singly and collectively to a position which will enable the implement to pass through very narrow gates or other constricted spaces.

A further object of the invention is to improve the hinge connection between the parts to avoid possibility of the wings becoming accidentally detached.

A further object of the invention is to so simplify and improve the connection between the parts that the center bar or draft element will not, when the device is in operation, be capable of being lifted above the level of the remaining part of the harrow, as is the case with many wing harrows of ordinary construction, and which is the cause of the draft element frequently passing over clods, rocks and the like, thereby raising the adjacent parts of the harrow wings to a non-engaging position with respect to the ground, resulting in defective and unsatisfactory work and frequently making it necessary to go over the ground twice.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of the improved wing harrow showing the wings extended. Fig. 2 is a rear elevation showing one wing raised. Fig. 3 is a rear elevation showing both wings raised. Fig. 4 is a transverse sectional view taken on the line 4—4 in Fig. 1. Fig. 5 is a longitudinal sectional view taken on the line 5—5 in Fig. 1. Fig. 6 is a perspective detail view of one of the hinge members.

Corresponding parts in the several figures are denoted by like characters of reference.

The center bar or draft element 15 consists of a bar of approximately rectangular cross section, the sides of said bar being beveled to produce a rearward taper. The forward end of the bar is provided with a link or clevis 16' for the attachment of the draft.

The wings B of the harrow are of approximately triangular shape comprising forwardly convergent inner and outer side bars 16, 17, obliquely disposed tooth carrying bars which are connected at their forward ends with the inner side bars 16, said bars 18 being disposed in substantially parallel relation to the outer side bars 17, and rear cross bars or braces 19. Harrow teeth 20 of any desired construction project downwardly not only from the bars 18, but from the bars 16, 17 as well, said teeth being arranged in any convenient manner. The bars 16 which for convenience have been designated as the inner side bars of the wings are obviously those which in practice are positioned contiguous to the center bar or draft element.

The center bar is equipped with hinge members C, D which are positioned respectively near the forward and the rearward ends of said bar, each of said members consisting of a yoke the bridge portion of which, 21, is seated in a transverse recess 22 of the center bar, while the limbs 23 extend forwardly from the bridge piece with respect to which said limbs are offset upwardly, forming shoulders 24, whereby said limbs are enabled to lie flat on the upper face of the center bar, while the bridge portions of the yoke are positioned in the transverse recesses 22 below the surface of said bar, thus locking the yokes in position against distortion or rocking movement.

Each of the wings B is provided with hinge straps E having terminal eyes 25 of oblong form for engagement with which the pintle formed by the limbs or side braces 23 of the respective yokes C are provided with upturned front terminals 26. The oblong eyes 25 are so disposed as to lie in a substantial horizontal plane when the wings are in position for operation; hence, in order to assemble the wings with or disassemble them from the center bar they must be moved to an upright or substantially vertical position, enabling the upturned front ends 26 of the pintle members to pass through said eyes, after which, by lowering the wings to operative position the upturned front ends 26 of the pintle members will obstruct the hinge bars and positively prevent accidental disassemblage of the wings from the center bar. For convenience in fitting the parts together, the limbs or pintle members 23 of the forward yoke C are made of a length exceeding that of the corresponding parts of the yoke or hinge member D. It will, moreover, be observed that when the parts are assembled, and the wings are in ground engaging position, any tendency to forward movement of said wings with respect to the center bar will be counteracted by the rearwardly tapering shape of said center bar, it being, of course, understood that the limbs or pintle members of each yoke C, D are disposed in parallel relation to each other and are, therefore, obliquely disposed with respect to the side faces of the center bar. For this obvious reason, any forward movement of the wings with respect to the center bar would cause said wings to become wedged and securely held against forward or disengaging movement.

One of the wings is provided with a hook 27 adapted to engage an eye 28 on the other wing, thus enabling the wings to be supported with respect to one another when in raised position. Each wing is also provided with a handle 29 whereby it may be manipulated.

From the foregoing description, taken in connection with the drawings hereto annexed, it will be readily understood that one or both wings may be moved to an upstanding position to facilitate the passage of the implement through narrow gates and the like. When both wings are thus lifted the implement will slide on the center bar as on a runner. When the wings are in ground engaging position their inner bars 16 will abut on the outer faces of the center bar, thereby preventing the latter from rising from the ground in such fashion as to leave unbroken clods and the like.

The general construction of the improved implement is simple and inexpensive, and it has proven to be thoroughly efficient for the purpose for which it is provided.

Having thus described the invention, what is claimed as new, is:—

1. In a wing harrow, a rearwardly tapering center bar constituting a draft element, hinge members connected therewith, each consisting of a bridge piece having forwardly extending limbs constituting pintles, said limbs being disposed in parallel relation, and wings equipped with hinge straps having eyes engaging said pintles, the faces of the inner side bars of said wings adapted to abut on the side faces of the center bar.

2. In a wing harrow, a center bar having transverse recesses, hinge members consisting of yokes having bridge pieces seated in said recesses and upwardly offset forwardly extending limbs disposed in parallel relation and constituting pintles, and wings having hinge straps provided with eyes engaging said pintles.

3. In a harrow, a center bar having transverse recesses, hinge members consisting of yokes having bridge pieces seated in said recesses and upwardly offset forwardly extending limbs disposed in parallel relation and having upturned front ends, said limbs constituting pintles, and wings having hinge straps provided with oblong eyes engaging the pintles, said eyes disposed in substantially horizontal position when the wings are in ground engaging position.

In testimony whereof we affix our signatures in presence of two witnesses.

CALVIN BRADHAM.
SAM CORNWELL.

Witnesses:
EDWIN GRIFFY,
HENRY BAKER.